(12) United States Patent
Schulze et al.

(10) Patent No.: US 12,510,183 B2
(45) Date of Patent: Dec. 30, 2025

(54) HYDROGEN VALVE

(71) Applicant: ECO HOLDING 1 GMBH, Marktheidenfeld (DE)

(72) Inventors: Dietmar Schulze, Münzenberg (DE); Mario Witopil, Marktheidenfeld (DE); Christian Faltinath, Föritztal (DE); Christopher Dejok, Frammersbach (DE)

(73) Assignee: ECO Holding 1 GmbH (DE)

( * ) Notice: Subject to any disclaimer, the term of this patent is extended or adjusted under 35 U.S.C. 154(b) by 105 days.

(21) Appl. No.: 18/274,546

(22) PCT Filed: Mar. 1, 2022

(86) PCT No.: PCT/EP2022/055112
§ 371 (c)(1),
(2) Date: Jul. 27, 2023

(87) PCT Pub. No.: WO2022/184694
PCT Pub. Date: Sep. 9, 2022

(65) Prior Publication Data
US 2024/0084918 A1    Mar. 14, 2024

(30) Foreign Application Priority Data

Mar. 1, 2021 (DE) .............. 10 2021 104 830.3
May 5, 2021 (DE) .............. 10 2021 111 708.9

(51) Int. Cl.
*F16K 31/40* (2006.01)
*H01M 8/04082* (2016.01)

(52) U.S. Cl.
CPC ....... *F16K 31/408* (2013.01); *H01M 8/04201* (2013.01)

(58) Field of Classification Search
CPC .................................................. F16K 31/408
See application file for complete search history.

(56) References Cited

U.S. PATENT DOCUMENTS

| 2,392,741 A | 1/1946 | Hurlburt |
| 2,654,393 A | 10/1953 | Ghromely |

(Continued)

FOREIGN PATENT DOCUMENTS

| DE | 10 2008 020 855 A1 | 9/2009 |
| DE | 10 2008 064 408 A1 | 6/2010 |

(Continued)

OTHER PUBLICATIONS

DE 10 2008 064 408 A1 English language machine translation.

(Continued)

*Primary Examiner* — Eric Keasel
(74) *Attorney, Agent, or Firm* — Lerner David LLP

(57) ABSTRACT

The presently disclosed invention relates to a hydrogen valve having a valve housing with a fluid inlet and a fluid outlet. The hydrogen valve includes a valve main body which is configured to be transferable between an open position, in which a volumetric flow connection is established between the fluid inlet and the fluid outlet, and a closed position, in which the valve main body is arranged in a main sealing seat fixed to the housing and the volumetric flow connection between the fluid inlet and the fluid outlet is closed. Also included is a pilot control valve device having a pilot member which is transferable by way of an actuator between an open position in which a throttle bore is exposed through the valve main body and connects the fluid inlet and the fluid outlet to each other and a closed position, in which the pilot member rests in a pilot control valve seat arranged on the valve main body and closes the throttle bore.

15 Claims, 7 Drawing Sheets

(56) References Cited

U.S. PATENT DOCUMENTS

| | | | | |
|---|---|---|---|---|
| 3,405,906 | A * | 10/1968 | Keller | F16K 31/408 |
| | | | | 251/30.04 |
| 4,799,645 | A | 1/1989 | Kramer et al. | |
| 7,156,363 | B2 * | 1/2007 | Parsons | E03C 1/057 |
| | | | | 251/30.04 |
| 7,334,770 | B2 | 2/2008 | Wang et al. | |
| 7,481,412 | B2 * | 1/2009 | Ishikawa | F16K 31/0658 |
| | | | | 251/30.04 |
| 8,066,255 | B2 * | 11/2011 | Wang | F02M 21/0266 |
| | | | | 251/30.04 |
| 2003/0020033 | A1 | 1/2003 | Wang | |

FOREIGN PATENT DOCUMENTS

| | | |
|---|---|---|
| DE | 10 2011 114 120 A1 | 3/2013 |
| DE | 10 2014 224 340 A1 | 6/2016 |
| DE | 10 2016 113 949 A1 | 3/2017 |

OTHER PUBLICATIONS

DE 10 2008 020 855 A1 English language machine translation.
DE 10 2011 114 120 A1 English language machine translation.
DE 10 2014 224 340 A1 English language machine translation.
DE 10 2016 113 949 A1 English language machine translation.

* cited by examiner

HYDROGEN VALVE

CROSS REFERENCE TO RELATED APPLICATIONS

This application is a US National Stage of International Application PCT/EP2022/055122, filed Mar. 1, 2022, which claims priority to two German priority applications DE102021104830.3, filed Mar. 1, 2021, and DE 102021111708.9, filed Mar. 5, 2023, the content of each of the aforementioned applications being incorporated by reference herein.

BACKGROUND OF THE INVENTION

The invention relates to a hydrogen valve comprising a valve housing with a fluid inlet and a fluid outlet, a valve main body which is designed to be transferable between an open position, in which a volumetric flow connection is established between the fluid inlet and the fluid outlet, and a closed position, in which the valve main body is arranged in a main sealing seat fixed to the housing and the volumetric flow connection between the fluid inlet and the fluid outlet is closed. The hydrogen valve further comprises a pilot valve device having a pilot body.

In the field of vehicle development, hydrogen is an alternative to conventional fuels. Due to the use of hydrogen in vehicles, the necessary valves in such fuel cell systems are exposed to extreme environmental conditions and must function absolutely reliably, not least because hydrogen is usually used as a gaseous fuel. A hydrogen valve must close reliably in every situation, be leak-proof and configured to operate as energy-efficiently as possible in continuous operation.

If conventional switching valves having two switching states are used to control the hydrogen gas flows, they have the disadvantage that the transition between the two switching states can occur too quickly, resulting in a steep pressure rise at the outlet of the valve. This steep pressure rise can lead to pressure wave propagation in the downstream circuit.

BRIEF SUMMARY OF THE INVENTION

The purpose of the invention is to create a hydrogen valve belonging to the technical field mentioned in the introduction, which at least partially overcomes the disadvantages of the prior art.

According to the invention, the hydrogen valve comprises a valve housing having a fluid inlet and a fluid outlet. In addition, the hydrogen valve comprises a valve main body, which is configured to be transferable between an open position, in which a volumetric flow connection is established between the fluid inlet and the fluid outlet, and a closed position, in which the valve main body is arranged in a main sealing seat fixed to the housing and the volumetric flow connection between the fluid inlet and the fluid outlet is closed. In addition, the hydrogen valve comprises a pilot control valve device with a pilot member which is configured to be transferable by means of an actuator between an open position, in which a throttle bore is exposed through the valve main body and connects the fluid inlet and the fluid outlet to one another, and a closed position, in which the pilot member rests in a pilot control valve seat arranged on the valve main body and closes the throttle bore.

The pilot control valve device advantageously establishes a volumetric flow connection via the throttle bore between fluid inlet and fluid outlet before the valve main body is switched. This reduces the pressure difference between the fluid inlet and fluid outlet, effectively preventing a steep pressure rise at the fluid outlet. Only in the subsequent step is the valve main body switched, establishing a direct volumetric flow connection between fluid inlet and fluid outlet.

A further advantage is achieved, for example, by the fact that the hydrogen valve according to the invention combines two valves in one housing, with only the pilot control valve device being actuated by the actuator. In other words, the actuator only has to actuate the pilot control valve device with a small amount of force, thereby opening the throttle bore. The valve main body opens automatically when a certain pressure difference is reached, and the actuator no longer needs to perform any additional actuation of the valve main body.

Overall, the hydrogen valve according to the invention reduces the number of components, the installation space and the electricity required to operate the hydrogen valve.

According to a preferred embodiment, the valve main body has a receptacle for the pilot member and for an energy accumulator, the pilot member being transferable into the open position by an actuator against a restoring force of the energy accumulator in order to release the throttle bore. This achieves the technical advantage, for example, that only the pilot member needs to be actuated to actuate the valve main body. The actuator merely has to actuate the pilot member, which is possible with a greatly reduced amount of force and thus with minimal on-board stress. Before the throttle bore is opened, a high pressure is applied on the fluid inlet side, which presses the valve main body into its closed position in the direction of the main sealing seat fixed to the housing. Actuating the actuator forces the pilot member into the receptacle in the form of a cage against the restoring force of the energy accumulator, causing the throttle bore to open. As the fluid flows through the throttle bore, the pressure difference between the fluid inlet and the fluid outlet is continuously reduced.

When the pressure falls below a certain fluid pressure difference, the restoring force of the energy accumulator is sufficient to open the valve main body against the fluid pressure difference between the fluid inlet and fluid outlet. In this case, the valve main body is transferred from the closed position to the open position solely by the restoring force of the energy accumulator. The actuator remains in its position and does not cover any further distance to enable the movement of the valve main body. This achieves, for example, the further technical advantage that the opening of the valve main body can take place independently of the voltage. Overall, the opening of the pilot member is performed electrically and the opening of the valve main body is performed mechanically.

For example, the pressure difference is less than 5 bar. For example, the pressure difference lies in an interval between 1 bar and 4 bar.

According to a preferred embodiment, the receptacle is in the form of a cylindrical cage. This has the technical advantage, for example, that the pilot member is axially guided within the cylindrical cage during the transfer from the closed position to the open position. This means that cogging can be ruled out despite high fluid pressure and strong forces. In addition, the receptacle acts as an abutment for the energy accumulator. The receptacle is firmly connected to the valve main body, which is why the restoring force of the energy accumulator acts on the valve main body via the receptacle and transfers it to the open position.

According to a particular embodiment, the actuator has an electrically actuable magnetic armature which is arranged inside the valve housing. This has the technical advantage, for example, that proven technical solutions can be used. Particularly when dealing with hydrogen, an actuator in conjunction with a magnetic armature is useful because the movement of the magnetic armature is ensured even when the valve housing is closed, and leakage of hydrogen during operation can be reduced as far as possible.

To ensure the most precise possible control of the pilot member independently of the valve main body, the pilot member is configured to be connected to the magnetic armature, whereby an axial movement of the magnetic armature is configured to be directly converted into an axial movement of the pilot member. This provides the additional technical advantage that the actuator can only actuate the pilot valve. The valve main body cannot be actuated directly, since this is only accomplished by the restoring force of the energy accumulator when the pressure difference between the fluid inlet and fluid outlet falls below a certain level.

According to a particularly advantageous embodiment, the hydrogen valve comprises a first spring element, which is configured to move the valve main body into the closed position. Preferably, the first spring element is configured as a compression spring and is supported relative to the valve housing. This achieves, for example, the technical advantage that the valve main body is always transferred to the closed position when the hydrogen valve is in the de-energized state. In addition, the technical advantage is achieved, for example, that the valve main body is held in the closed position even against accelerations occurring randomly during operation. This may occur irregularly during operation of the motor vehicle, for example. For example, the first spring element is configured to compensate accelerations of up to 15 g. 15 g corresponds to fifteen times the normal acceleration caused by gravity. To move the valve main body to the open position, the restoring force of the energy accumulator must be greater than the sum of the compressive force of the first spring element on the valve main body and the pressure difference between fluid inlet P and fluid outlet A.

Preferably, the first spring element is arranged coaxially to the receptacle. This achieves the technical advantage, for example, that a particularly compact arrangement of the first spring element is possible. In addition, the first spring element is configured to be guided by the cylindrical body of the receptacle, which further increases the functional reliability of the hydrogen valve.

According to an additional particularly advantageous embodiment, the hydrogen valve comprises a second spring element, which is configured to transfer the pilot member into the closed position. This achieves the technical advantage, for example, that the pilot member is always transferred to the closed position even in a de-energized state of the hydrogen valve. This safety-specific aspect is primarily due to operation with hydrogen. Another aspect is an improvement in the response behaviour of the hydrogen valve, which can also be transferred to the closed position much more easily after opening.

To simplify the assembly of the hydrogen valve, the second spring element is arranged on a side of the pilot member facing away from the magnetic armature. This has the additional technical advantage that the second spring element can be designed as a simple compression spring, with the restoring force of the second spring element acting directly on the magnetic armature and thus directly on the pilot member. Thus, there is a mechanically reliable force that transfers the pilot member to the closed position. In addition, the hydrogen valve is considerably easier to assemble.

To improve the sealing effect of the valve main body and at the same time to increase the service life of the hydrogen valve, the main sealing seat has a circumferential first contour edge and a circumferential second contour edge, the first contour edge being in contact with a sealing element of the valve main seat in the closed position and the second contour edge being designed as a stop for the valve main body relative to the main sealing seat. The first contour edge can be formed, for example, with a sharp edge and the sealing element on the valve main body can be formed as a soft elastomer. In the closed state, the sharp-edged first contour edge engages with the soft elastomer of the sealing element, whereby a high sealing effect can be achieved. However, to prevent the sharp-edged first contour edge from engaging too deeply and thus preventing wear of the sealing element, the second contour edge serves as a stop between the valve main body and the main sealing seat. The second contour edge, for example, is configured to make direct contact between the valve main body and the main sealing seat alongside the sealing element, allowing the penetration depth of the first contour edge into the sealing element to be precisely determined.

According to an additionally advantageous embodiment, the hydrogen valve comprises a pole tube for guiding the electrically actuable magnetic armature, wherein an extension of the pole tube is formed for guiding the valve main body between the closed and the open position. Thus, the pole tube includes an extended section which serves as a valve bushing and guides the valve main body. This provides the additional technical advantage of simplifying assembly of the hydrogen valve due to the reduced number of components.

According to a particularly preferred embodiment, the pole tube is made of magnetizable stainless steel.

According to a further aspect of the invention, the task is achieved by a hydrogen valve according to one of the above embodiments in a fuel cell assembly for controlling a hydrogen supply to a fuel cell. Thereby, for example, comparable advantages as in the previously described embodiments are achieved. In particular, the pilot control valve device is configured to establish a volumetric flow connection via the throttle bore between the fluid inlet and the fluid outlet before the valve main body is switched, thereby reducing the pressure difference between the fluid inlet and the fluid outlet and effectively avoiding a steep pressure rise at the fluid outlet. In addition, the actuator only actuates the pilot control valve device, which means that the actuator only has to actuate the pilot control valve device with a small amount of force and thus open the throttle bore. The valve main body opens automatically when a certain pressure difference is reached, whereby the actuator does not have to perform any additional actuation of the valve main body. The number of components, the installation space and the electricity required to operate the hydrogen valve and thus the fuel cell are reduced.

According to an additional aspect of the invention, the problem is solved by a method for controlling a hydrogen valve according to one of the above embodiments. The method comprises the steps of transferring the pilot member to an open position and releasing the throttle bore by means of energizing the actuator to reduce a pressure difference between fluid inlet and fluid outlet, and transferring the valve main body to an open position to establish a volumetric flow connection between the fluid inlet and the fluid outlet when a certain pressure difference between fluid inlet and fluid outlet is reached. Thus, comparable advantages as in the preceding embodiments are achieved. The sequence of the individual process steps is particularly advantageous. First, energizing the actuator of the pilot member transfers it to the open position. This causes the valve main body to establish a volumetric flow connection via the throttle bore between the fluid inlet and fluid outlet, which reduces the pressure difference between the fluid inlet and fluid outlet, effectively preventing a steep pressure rise at the fluid outlet. Only in the subsequent step is the valve main body switched, establishing a direct volumetric flow connection between fluid inlet and fluid outlet.

According to an advantageous embodiment, the transfer of the pilot member into an open position takes place against a restoring force of an energy accumulator, and the transfer of the valve main member into an open position takes place by the relaxation of the energy accumulator. This has the technical advantage, for example, that the transfer of the valve main body is not carried out by an additional movement of the actuator but by the restoring force of the energy accumulator, the restoring force being strong enough to move the valve main body from a certain pressure difference. The actuator therefore only has to be operated with a small amount of force and a small distance to move the pilot control valve device, which can be done with a greatly reduced amount of force and thus with minimal on-board stress. Before the throttle bore is opened, a high pressure is applied on the fluid inlet side, which presses the valve main body into its closed position in the direction of the main sealing seat fixed to the housing. Actuating the actuator moves the pilot member against the restoring force of the energy accumulator, causing the throttle bore to open. As the fluid flows through the throttle bore, the pressure difference between the fluid inlet and the fluid outlet is continuously reduced. When the pressure falls below a certain fluid pressure difference, the restoring force of the energy accumulator is sufficient to open the valve main body against the fluid pressure difference between the fluid inlet and fluid outlet. In this case, the valve main body is transferred from the closed position to the open position solely by the restoring force of the energy accumulator. The actuator remains in its position and does not travel any further distance to enable the movement of the valve main body. The opening of the valve main body can thus take place independently of the voltage, whereby the opening of the pilot member is accomplished electrically and the opening of the valve main body is accomplished mechanically.

According to a particularly advantageous further development of the invention, when the actuator is supplied with a minimum current intensity, an immediate and complete transfer of the pilot member to an open end-position takes place, and the transfer of the valve main body to an open position takes place immediately afterwards when a certain pressure difference between fluid inlet and fluid outlet is reached. This achieves, for example, the technical advantage that the magnetic armature is moved directly to the end-position at the minimum current level, thus achieving an opening behaviour of the main valve body that is independent of the supply voltage. In other words, only the minimum current strength is necessary to ensure complete functioning of the hydrogen valve. For example, if the on-board voltage in a motor vehicle is 12 V, it is not essential that this on-board voltage prevails for the hydrogen valve to function. For example, the minimum amperage is 8.5 V. As a result, the operation of the hydrogen valve is ensured even with a lower battery voltage.

According to a further aspect, the invention relates to a pneumatic valve for controlling a gaseous medium, in particular hydrogen, having a housing with at least one inlet and one outlet, a main piston which forms a main stage with a main sealing seat in the housing and is arranged so as to be axially displaceable along a longitudinal axis in a housing bore for opening and closing a direct volumetric flow connection between the inlet and the outlet, and a pilot piston which forms a pilot stage with a pilot sealing seat on or in the main piston, the pilot piston being operatively connected to an actuator for opening or closing a throttle bore in the main piston, the inlet being connected to the pilot stage by means of the throttle bore. in the main piston, the pilot piston being operatively connected to an actuator for opening or closing a throttle bore in the main piston, it being possible to connect the inlet to the outlet indirectly via the main piston by means of the throttle bore, the main and pilot stages being closed when the pneumatic valve is de-energized. The pilot stage advantageously enables a volumetric flow connection of the inlet and outlet via the throttle bore and thus a reduction in the pressure difference between the inlet and outlet. In this way, a steep pressure rise at the outlet can be effectively avoided. Only when the main stage is opened is a direct volumetric flow connection established between the inlet and outlet.

Thus, the invention does not require multiple valves for pressure equalization and main volumetric flow with the corresponding number of housings, actuators, etc. Instead, the pneumatic valve according to the invention combines two valves in one housing, which can be adjusted by force and/or pressure control via an actuator. The number of components, installation space and costs can be reduced in a targeted manner.

Furthermore, the task is achieved by a method for controlling a gaseous medium, in particular hydrogen, in a fuel cell assembly by means of a pneumatic valve, in which the main stage and the pilot stage are closed when the actuator is de-energized, the pilot stage is opened when a constant current is applied to the actuator, so that a pressure difference between the inlet and outlet is reduced or, respectively pressure compensation takes place via the throttle bore in the main piston, the main stage opens as soon as the pressure difference between input and output falls below a predetermined switching pressure when a switching threshold is reached, the main piston being moved into an open position against the closing force and the main stage remaining closed as long as the pressure difference between input and output is above the predetermined switching pressure.

Advantageously, the opening of the pilot stage allows a volumetric flow connection of inlet and outlet via the throttle bore and thus a reduction of the pressure difference between inlet and outlet. In this way, a steep pressure rise at the outlet can be effectively avoided. Only when the main stage is opened at a pressure difference below the predetermined switching pressure is a direct volumetric flow connection established between the inlet and outlet via the main stage.

A pneumatic valve in the sense of the present invention can thus also be understood as a hydrogen valve, since it must be suitable for this purpose. A housing within the meaning of the present invention may also be referred to as a valve housing, and a pilot stage may also be referred to as a pilot control valve device.

Further advantageous embodiments and combinations of features of the invention result from the following detailed description and the totality of the patent claims.

BRIEF DESCRIPTION OF THE SEVERAL VIEWS OF THE DRAWINGS

Further advantageous features and details of the various embodiments of this disclosure will become apparent from the ensuing description of preferred exemplary embodiment or embodiments and further with the aid of the drawings. The features and combinations of features recited below in the description, as well as the features and feature combinations shown after that in the drawing description or in the drawings alone, may be used not only in the particular combination recited by also in other combinations on their own without departing from the scope of the disclosure.

The drawings used to explain the embodiment example show.

Basically, the same parts are provided with the same reference signs in the figures.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of" "A, B, and C" should be understood as including not only one of A, only one of B, only one of C, or any combination of A, B, and C.

Figure 1:
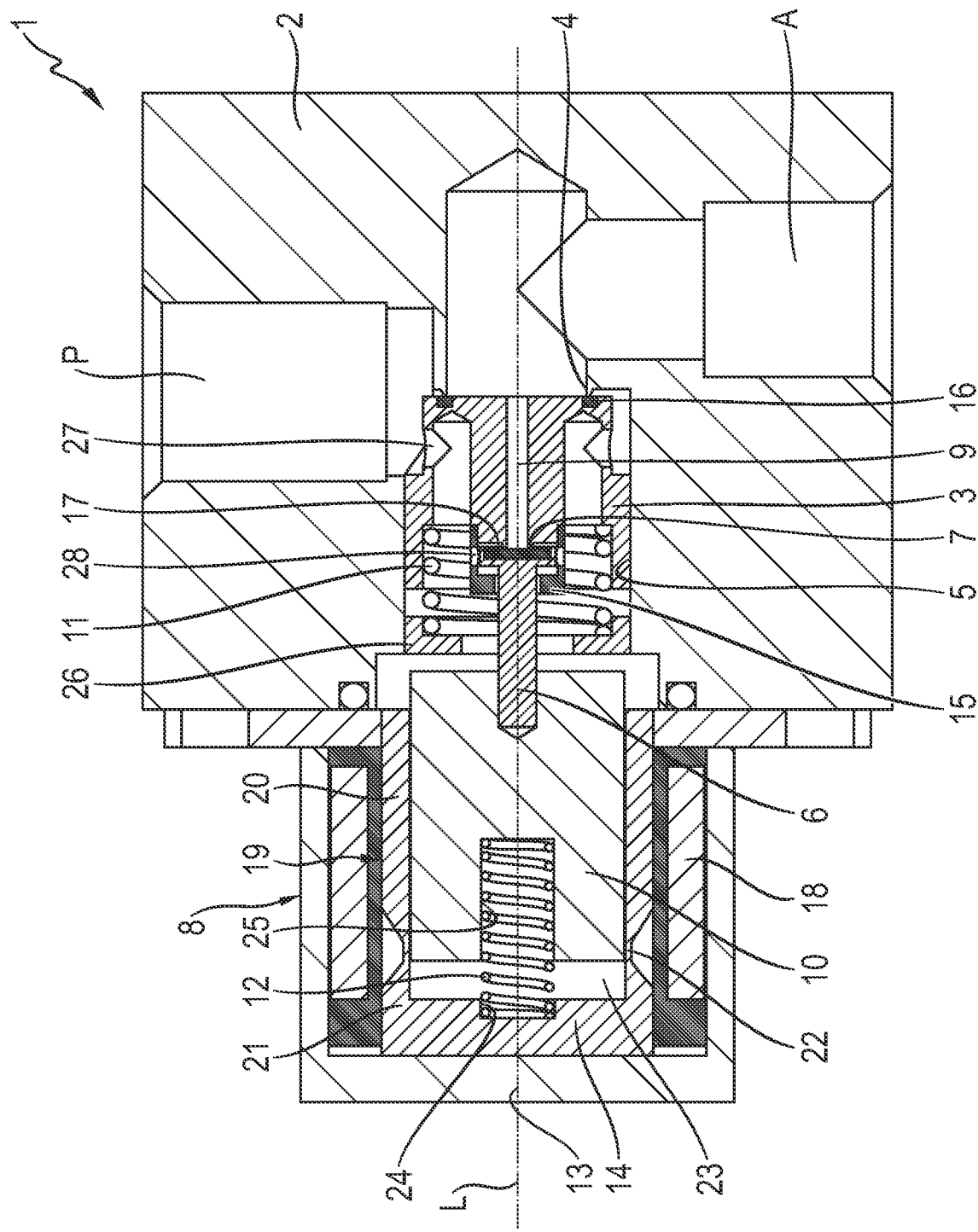
FIG. 1 a longitudinal section of the pneumatic valve in a closed position with the main and pilot stages closed.

FIG. 1 shows a pneumatic valve 1 according to the invention in longitudinal section in a closed position, which is provided for controlling a gaseous medium, in particular hydrogen. It comprises a housing 2 with at least one inlet P and one outlet A, the inlet P and the outlet A being configured as housing bores to which lines of a fuel cell arrangement are connectable. In the housing 2, a main piston 3 for opening and closing a direct volumetric flow connection between the inlet P and the outlet A is arranged so as to be axially displaceable along a longitudinal axis L of the pneumatic valve 1 in a housing bore 5 and forms a main stage with a main sealing seat 4 in the housing 2. As can be seen from FIG. 1, the main stage opens and closes the direct volume connection of the housing bores of inlet P and outlet A. When the main stage is closed, the main piston 3 is in contact with the main sealing seat 4. In this case, the main piston 3 has a circumferential sealing element 16 on its end face, which is configured to be placed against the main seat 4. This can be arranged in a circumferential groove on the end face of the main piston 3. In the embodiment shown, the main sealing seat 4 is formed as a circumferential projection. Further, the pneumatic valve 1 has a pilot stage which comprises a pilot piston 6 and a pilot sealing seat 7. The pilot sealing seat 7 is arranged on or in the main piston 3. For tight contact, the pilot piston 6 has a disk-shaped sealing element 17, which is configured to be placed in a sealing manner against the pilot sealing seat 7, which is designed as a circumferential projection, and thus closes the pilot stage. The pilot piston 7 is in operative connection with an actuator 8 for opening or closing a throttle bore 9 in the main piston 3. By means of the throttle bore 9, the inlet P is configured to be connected to the outlet A indirectly via the main piston 3.

The actuator 9 is provided as an electromagnetic actuator, which has an armature 10 operatively connected to the pilot piston 6 and arranged coaxially with the housing 2. Further, the armature 10 is movably accommodated in the actuator housing 13 of the actuator 8 by means of the magnet coil 18 comprising the armature 10, which encloses the magnet coil 18 on an outer circumference and on at least one end-face facing away from the housing 2. Further, the actuator 8 has a pole cap 19 arranged in the interior of the actuator housing 13, which comprises a pole core 20 and a pole tube 21 axially following one another in the direction of the end face of the magnet coil 18. Pole core 20 and pole tube 21 are integrally connected by a connecting web 22. Coaxial errors can thus be eliminated. The armature 10 may be slidably supported in a foil structure arranged in the inner space 23 (also called armature space). Alternatively, the armature 10 may be coated. A foil structure or coating serves to magnetically separate the armature 10 and the pole cap 19, thereby reducing the magnetic transverse forces. The pole tube 21 is closed in one piece on the end face facing away from the housing 2, although a separate end cover is likewise possible. The actuator housing 13 is further sealed to the housing 2.

As can also be seen from FIG. 1, the main piston 3 and the pilot piston 6 are each configured to be pushed by spring means into a closed position in which the main stage and the pilot stage are closed and no volumetric flow connection is possible between inlet P and outlet A. The main piston 3 and the pilot piston 6 are each configured to be pushed into a closed position by spring means. Compression springs 11, 12 are provided as spring means, a first compression spring 11, which is configured to act on the main piston 3, being arranged between the main piston 3 and the housing 2 and a second compression spring 12, which is configured to act on the pilot piston 6, being arranged between the armature 10 and the pilot piston 6 or between the armature 10 and an actuator housing 13 or a pole cap 14. The second compression spring 12 or its ends are each guided in recesses 24 or 25 of the pole cap 14 or the armature 10, so that buckling of the compression spring 12 can be ruled out. The first compression spring 11 is configured to rest against a stop 26 fixed in the housing 2. The gaseous medium, in particular hydrogen, of the fuel cell assembly is controlled by means of the pneumatic valve 1. In this case, when the actuator 8 is de-energized, the main stage and the pilot stage are closed by the spring force of the compression springs 11, 12 and/or the pressure force of the medium pressure applied to the inlet P. The main stage is closed by the pilot stage. The medium pressure applied to the outlet A is lower and there is a pressure difference between P and A. Pressurization of the main piston 3 and the pilot piston 6 can be achieved by means of apertures 27 and 28 on the main piston 3 and on a stop 15 for the pilot piston 6, respectively. The stop 15 is attached to the main piston 3 and forms a stroke limitation for the pilot piston 6.

Figure 2:
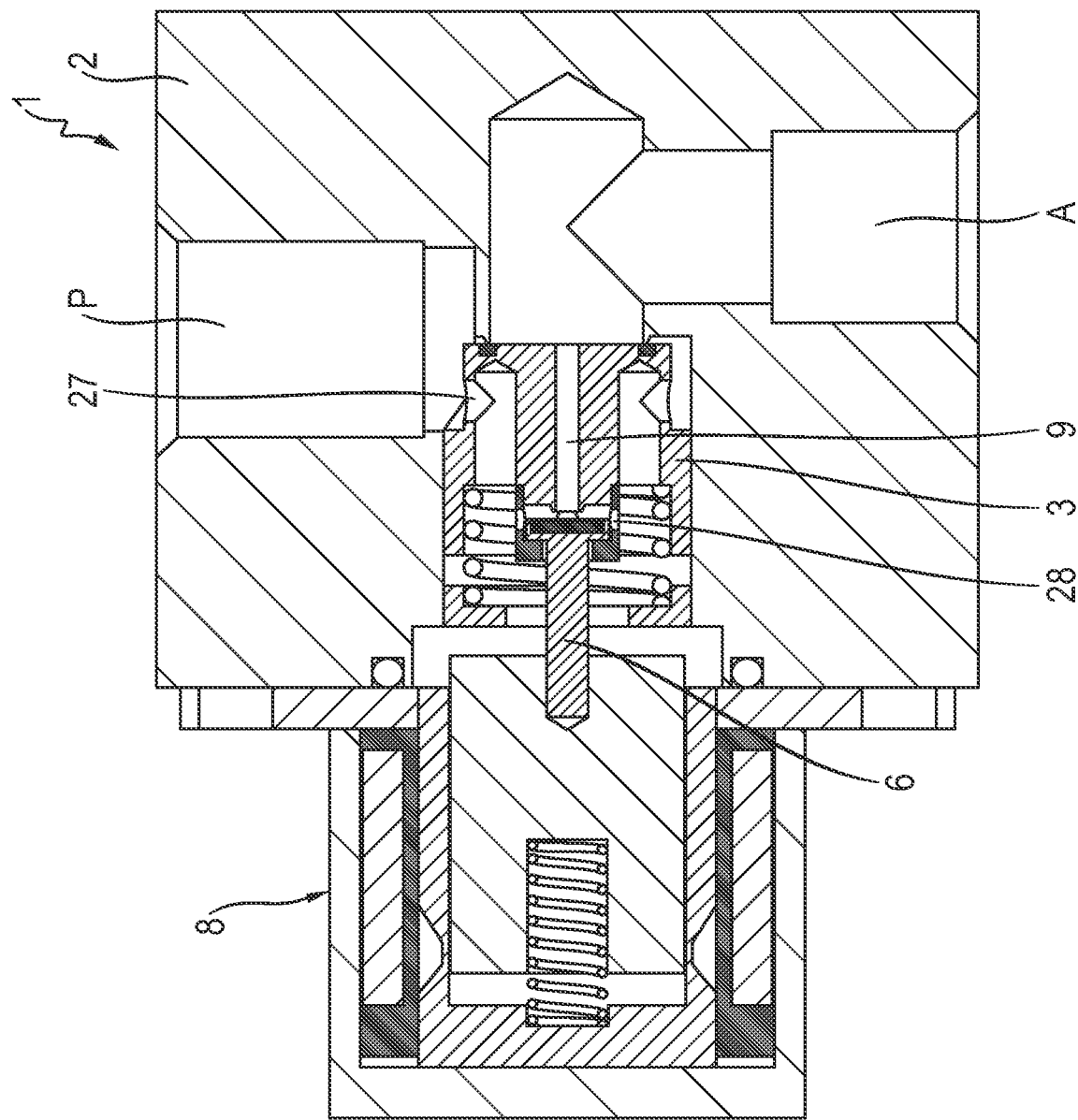
FIG. 2 the longitudinal section of the pneumatic valve according to FIG. 1 with the pilot stage open.

When a constant current is applied to the actuator 8, the pilot stage is first opened by the actuator 8 pulling the pilot piston 6 to its open position and the pilot piston 6 is lifted from its pilot sealing seat 7. This position of the pneumatic valve 1 is shown in FIG. 2. The pressure difference between inlet P and outlet A decreases as pressure equalization takes place via the apertures 27 and 28 and the throttle bore 9 in the main piston 3.

Figure 3:
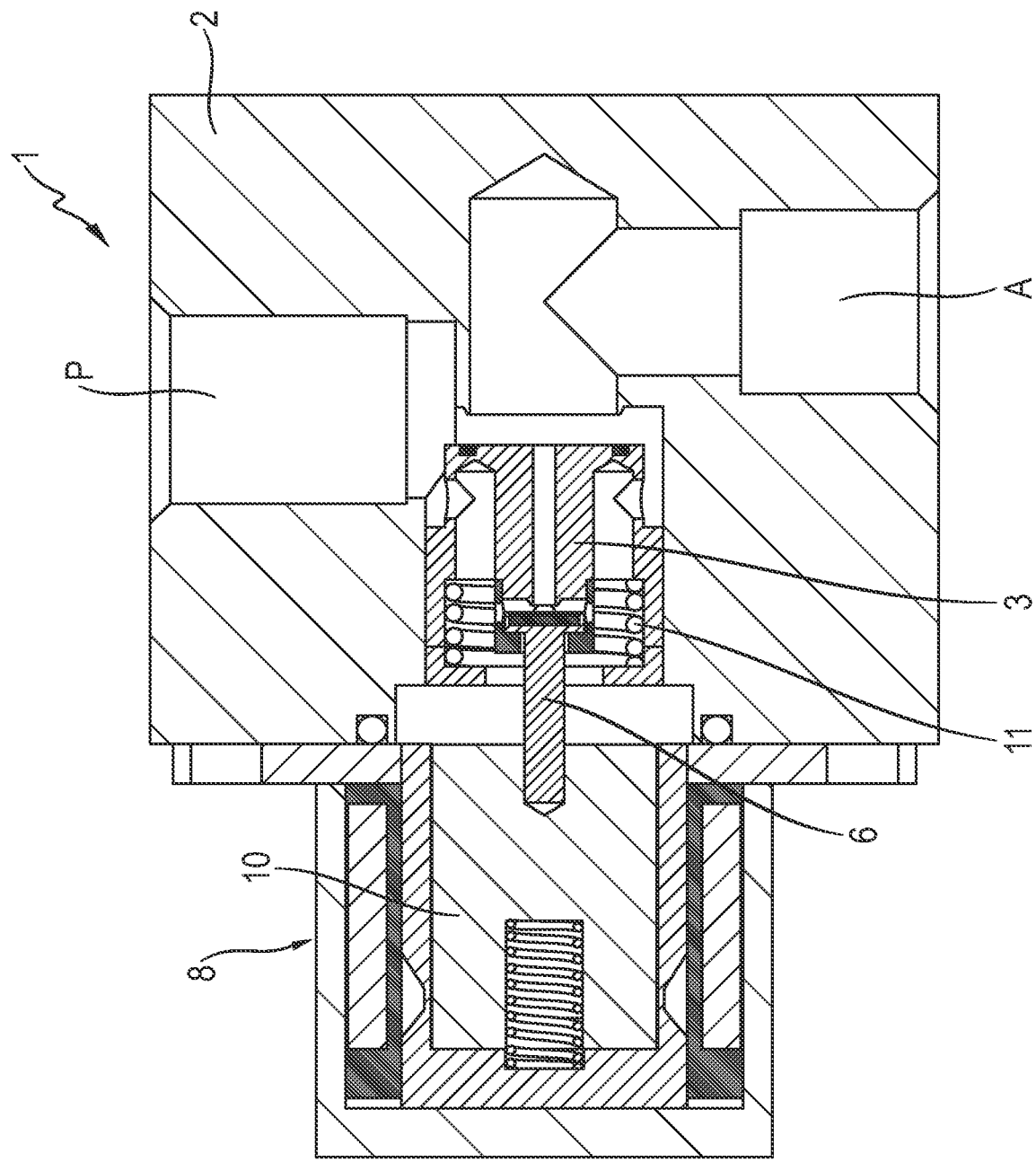
FIG. 3 the longitudinal section of the pneumatic valve according to FIG. 1 opened pilot and main stages.

As soon as the pressure difference between inlet P and outlet A falls below a predetermined switching pressure due to the continuing pressure equalization, a switching threshold is reached and the main stage opens by lifting the main piston 3 off the main sealing seat 4, as shown in FIG. 3. The main piston 3 is moved into an opening position against the closing force, in particular of the compression spring 11. In other words, the main stage opens under positive control as soon as the sum of the closing forces of pressure and spring preload falls below the actuator force. The main stage remains closed as long as the pressure difference between input P and output A is above the predetermined switching pressure.

Figure 4:
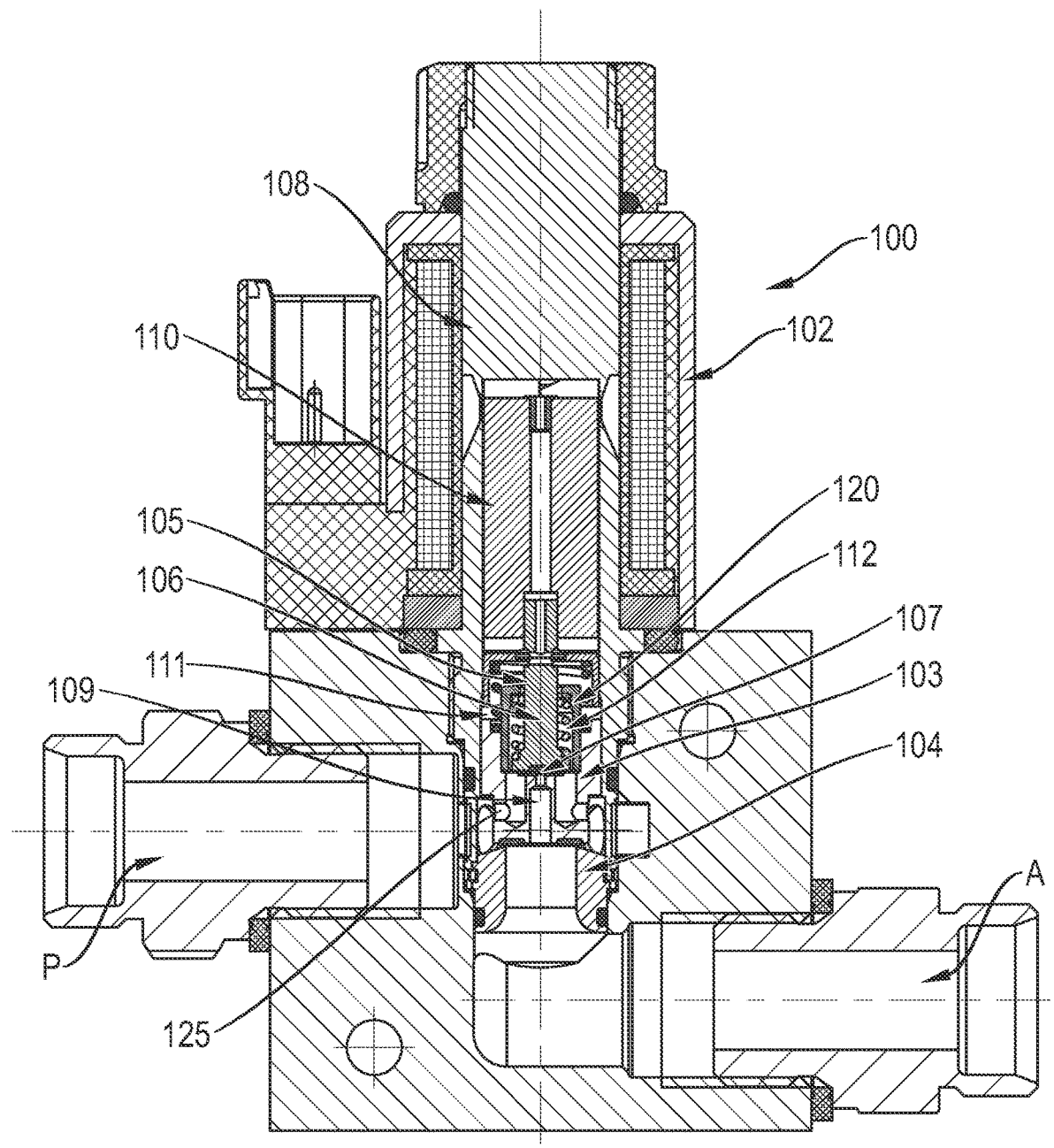
FIG. 4 a cross-sectional view of an exemplary embodiment of the hydrogen valve according to the invention.

FIG. 4 shows a cross-sectional view of an exemplary embodiment of the hydrogen valve 100 according to the invention. The hydrogen valve 100 comprises a valve housing 102 having a fluid inlet P and a fluid outlet A. A valve main body 103 is located in the valve housing 102. The valve main body 103 is in contact with a main sealing seat 104 fixed to the housing, whereby a volumetric flow connection between the fluid inlet P and the fluid outlet A is closed. Thus, fluid originating from the fluid inlet P can only flow into the space behind the valve main body 103 through a fluid inlet opening 125. Thus, the fluid pressure downstream of the valve main body 103 is identical to the fluid pressure at the fluid inlet P. In other words, the fluid pressure P presses the valve main body 103 into the main sealing seat 104 fixed to the housing.

The valve main body 103 is designed to be transferable between the closed position, in which it is in contact with the main sealing seat 104 fixed to the housing, and an open position, in which the valve main body 103 is spaced from the main sealing seat 104. In the open position, a maximum volumetric flow is established between the fluid inlet P and the fluid outlet A. In addition, the hydrogen valve 100 comprises a pilot control valve device 105 having a pilot member 106 arranged downstream of the valve main body 103 and closing or opening a throttle bore 109 through the valve main body 103. By means of an actuator 108, the pilot member 106 is configured to be directly transferred between an open position in which a throttle bore 109 is released and a closed position in which the pilot member 106 abuts against a pilot control valve seat 107 and closes the throttle bore 109. By unblocking the throttle bore 109, a fluid connection with a very small cross-section is established between the fluid inlet P and the fluid outlet A, thereby enabling fluid equalization and thus pressure equalization between the fluid inlet P and the fluid outlets A. Thus, continuous pressure equalization is enabled via the throttle bore 109, which continuously reduces the fluid pressure P that presses the valve main body 103 into the main sealing seat 104 fixed to the housing.

The pilot member 106 is transferred to the open position by actuation of the actuator 108, whereby the pilot member 106 is forced into a cylindrical receptacle 120 against the restoring force of an energy accumulator 112, thereby releasing the throttle bore 109. By retaining the pilot member 106, the restoring force of the energy accumulator 112 remains in the form of a compression spring, while due to the pressure compensation via the throttle bore 109, the fluid pressure P, which presses the valve main body 103 into the main sealing seat 104 fixed to the housing, is continuously reduced. If the magnetic armature 110 of the actuator 108 remains unchanged in its position, the restoring force of the energy accumulator 112 opposes the pressure force of the fluid pressure P on the valve main body 103. At a certain time, the pressure difference between the fluid inlet P and the fluid outlet A is reduced such that the restoring force of the energy accumulator 112 exceeds the fluid force on the valve main body 103 due to the pressure difference. Consequently, the valve main body 103 disengages from the main sealing seat 104 fixed to the housing and is transferred to the open position. In the open position, a volumetric flow is established between the fluid inlet P and the fluid outlet A. The pressure difference between fluid inlet P and fluid outlet A has thus been reduced in the first step by the throttle bore, and a steep pressure rise at fluid outlet A is avoided. A first spring element 111 is arranged coaxially to the cylindrical receptacle 120 and serves to transfer the valve main body 103 to the closed position.

Figure 5:
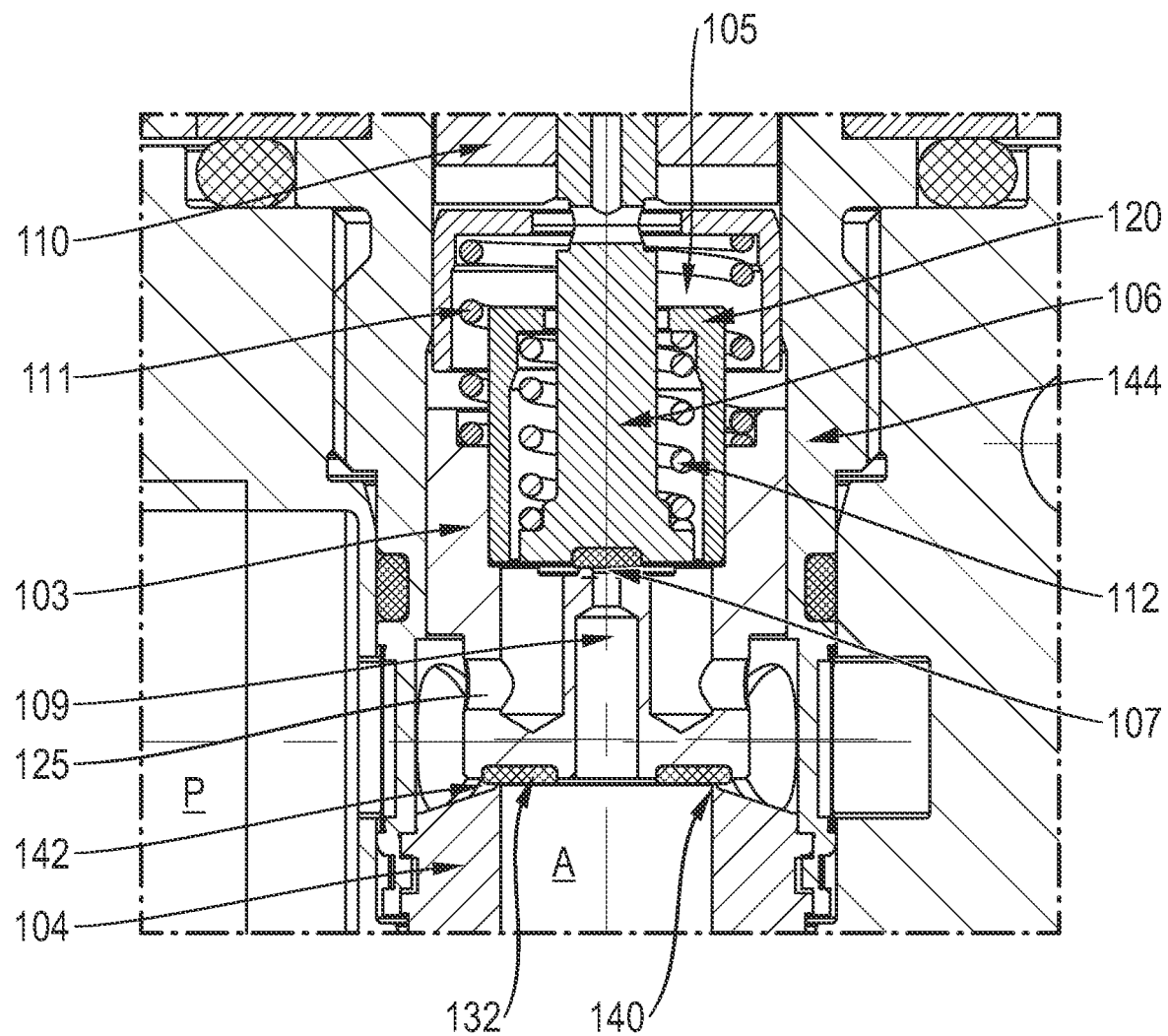
FIG. 5 an enlarged cross-sectional view of a valve main body including a pilot control valve device.

FIG. 5 shows an enlarged cross-sectional view of a valve main body 103 including the pilot control valve device 105. The main sealing seat 104 has a circumferential first contour edge 140 and a circumferential second contour edge 142 on a side facing the valve main body 103. The first contour edge 140 and the second contour edge 142 run parallel to one another in a circumferential direction around the main sealing seat 104. The first contour edge 140 is disposed radially inwardly and the second contour edge 142 is disposed radially outwardly. The first contour edge 140 is arranged in correspondence with a sealing element 132 of the valve main body 103. In other words, the first contour edge 140 of the main sealing seat 104 and the sealing element 132 of the valve main body 103 meet in direct contact with each other in the closed state. On the other hand, the second contour edge 142 is in direct contact with the valve main body 103 as a stop in the closed position, whereby a defined minimum distance between the main sealing seat 104 and the valve main body 103 is achieved in the closed position, which allows an optimum between sealing and wear at the sealing element 132.

The magnetic armature 110 and the valve main body 103 are supported within a pole tube 144. The pole tube 144 is integral and preferably formed of magnetizable stainless steel, and serves as a guide for both the magnetic armature 110 and the valve main body 103 from the fully open position to the fully closed position. A repeated description of identical features is omitted.

Figure 6:
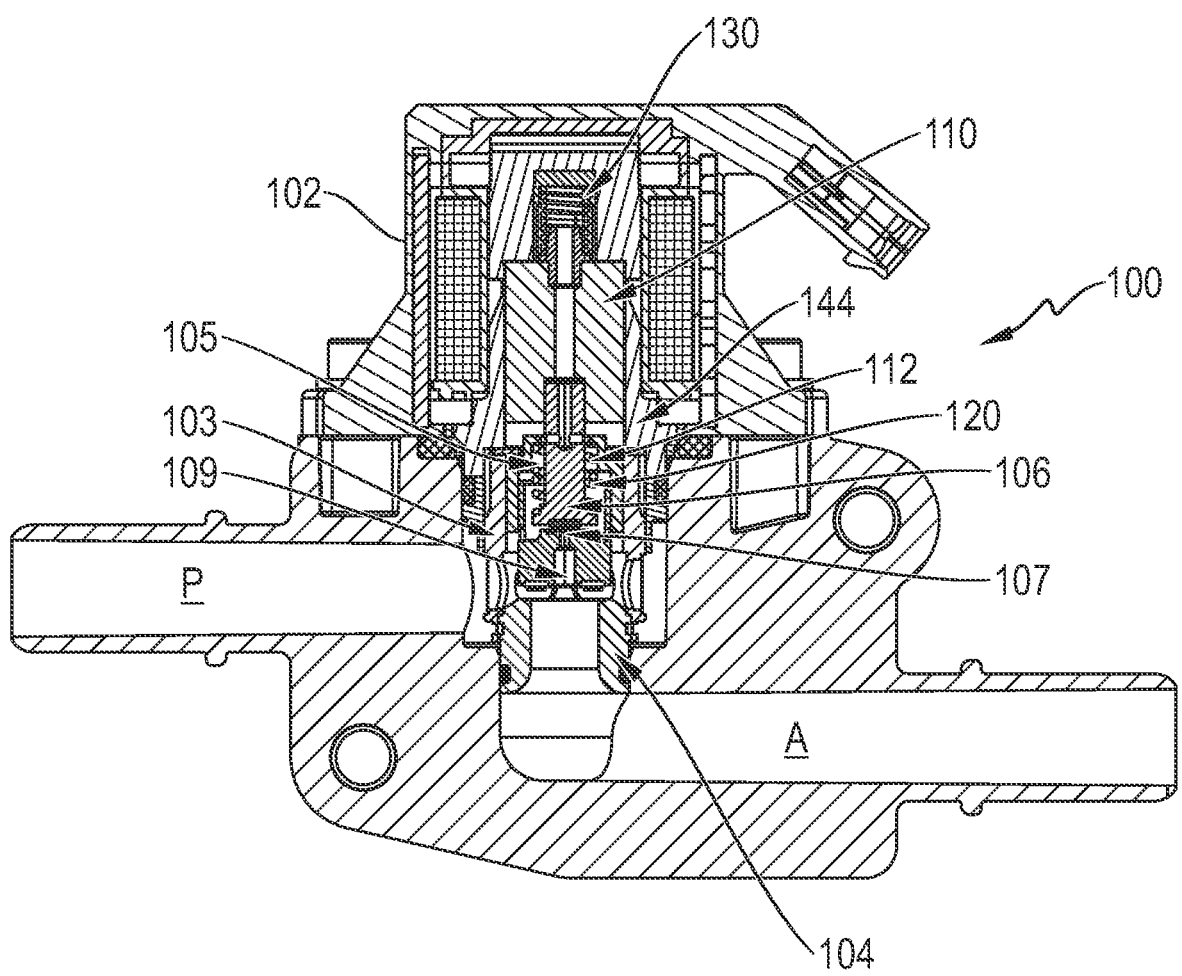
FIG. 6 a cross-sectional view of a further exemplary embodiment of the hydrogen valve according to the invention.

FIG. 6 shows a cross-sectional view of a further exemplary embodiment of the hydrogen valve 100 according to the invention. Deviating from the embodiment in FIGS. 4 and 5, the hydrogen valve 100 has a second spring valve 130. The second spring valve 130 serves to transfer the pilot member 106 into the closed position. The second spring element 130 is located on a side of the magnetic armature 110 facing away from the pilot member 106, and is supported relative to a wall of the valve housing 102. In the de-energized state of the hydrogen valve 100, the second spring element 130 acts on the magnetic armature 110 and thus directly on the pilot member 106, moving the pilot member 106 to the closed position. In the closed position, the pilot member 106 is in contact with the pilot control valve seat 107, thereby closing the throttle bore 109.

Figure 7:
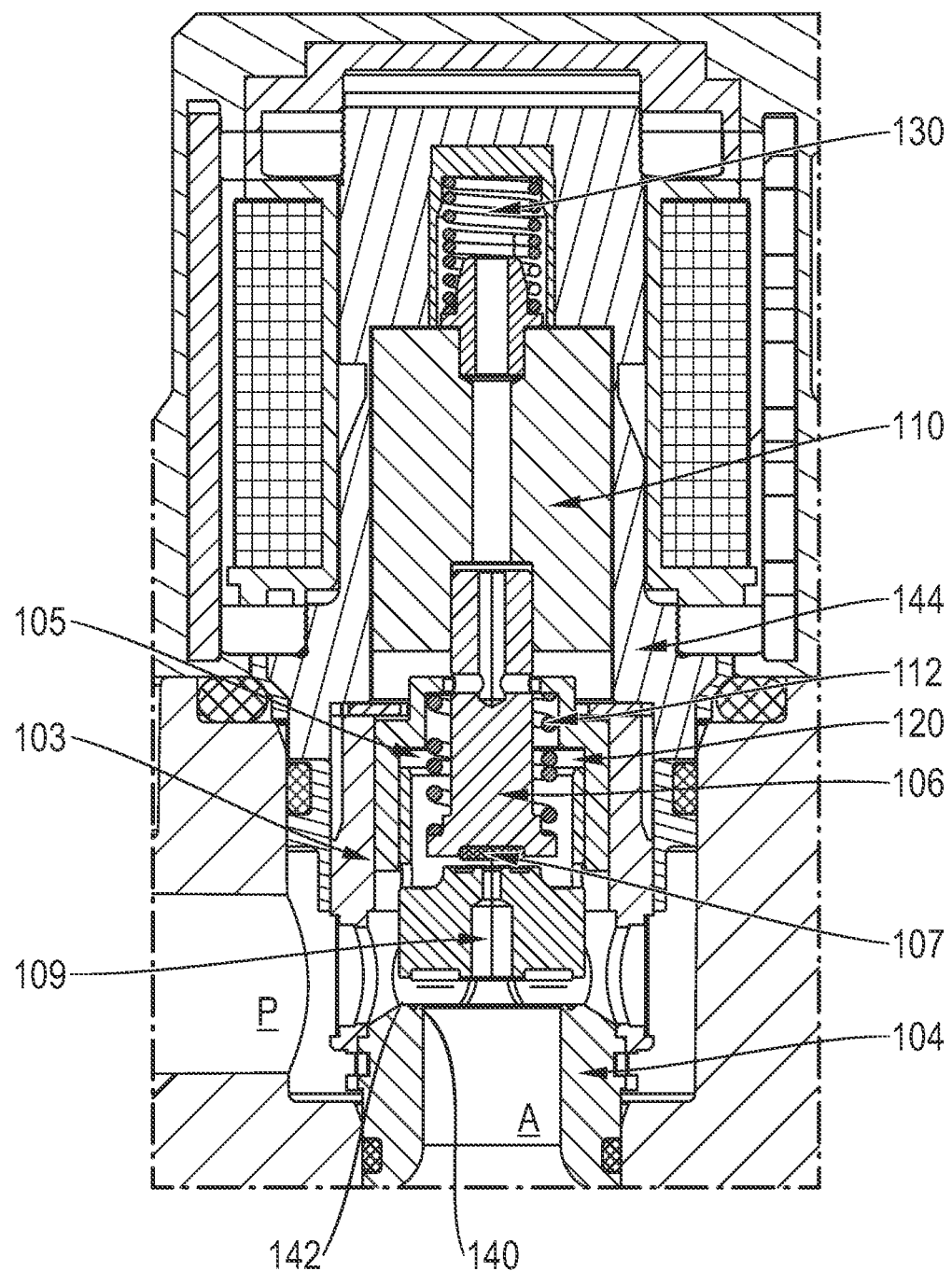
FIG. 7 an enlarged cross-sectional view of a further valve main body including a pilot control valve device.

FIG. 7 shows an enlarged cross-sectional view of another valve main body 103 including a pilot control valve device 105.

Since the devices and methods described in detail above are examples of embodiments, they can be modified to a wide extent by the skilled person in the usual manner without departing from the scope of the invention. In particular, the mechanical arrangements and the proportions of the individual elements with respect to each other are merely exemplary. Some preferred embodiments of the apparatus according to the invention have been disclosed above. The invention is not limited to the solutions explained above, but the innovative solutions can be applied in different ways within the limits set out by the claims.

The invention claimed is:

1. A hydrogen valve, comprising:
a valve housing comprising a fluid inlet and a fluid outlet,
a valve main body configured to be transferable between an open position, wherein a volumetric flow connection is established between the fluid inlet and the fluid outlet, and a closed position, wherein the valve main body is arranged in a main sealing seat fixed to the housing, and the volumetric flow connection between the fluid inlet and the fluid outlet is closed off;
a pilot control valve device, comprising a pilot member configured to be transferable by an actuator between an open position, wherein a throttle bore is arranged to be exposed through the valve main body and to connect the fluid inlet and the fluid outlet, and a closed position, wherein the pilot member is arranged to abut a pilot control valve seat disposed within an opening in the valve main body and to close the throttle bore, and
a receptacle for the pilot member and for an energy accumulator, the receptacle provided in addition to the valve main body,
wherein the receptacle is firmly connected to the valve main body, wherein the pilot member is transferable into the open position by the actuator, whereby the pilot member is forced into the receptacle against a restoring force of the energy accumulator in order to release the throttle bore, the receptacle acting as an abutment for the energy accumulator.

2. The hydrogen valve according to claim 1, wherein the receptacle comprises a cylindrical cage.

3. The hydrogen valve according to claim 1, wherein the actuator comprises an electrically actuable magnetic armature arranged within the valve housing.

4. The hydrogen valve according to claim 3, wherein the pilot member is connected to the magnetic armature, and wherein an axial movement of the magnetic armature is configured to be directly converted into an axial movement of the pilot member.

5. The hydrogen valve according to claim 3, wherein the hydrogen valve comprises a pole tube configured and arranged to guide the electrically actuable magnetic armature, and an extension of the pole tube is configured to guide the valve main body between the closed and the open position.

6. The hydrogen valve according to claim 5, wherein the pole tube comprises a magnetizable stainless steel.

7. The hydrogen valve according to claim 1, wherein the hydrogen valve comprises a second spring element configured to transfer the pilot member into the closed position.

8. The hydrogen valve according to claim 7, wherein the second spring element is arranged on a side of a magnetic armature facing away from the pilot member.

9. The hydrogen valve according to claim 1, wherein the main sealing seat comprises a circumferential first contour edge and a circumferential second contour edge, the first contour edge arranged in contact with a sealing element of the valve main body in the closed position, and the second contour edge configured as a stop for the valve main body with respect to the main sealing seat.

10. The hydrogen valve according to claim 1, wherein the hydrogen valve comprises a first spring element configured to transfer the valve main body into the closed position.

11. The hydrogen valve according to claim 10, wherein the first spring element is arranged coaxially to the receptacle.

12. A fuel cell assembly comprising:
a hydrogen valve configured to control a supply of hydrogen to a fuel cell, the hydrogen valve comprising:
a valve housing comprising a fluid inlet and a fluid outlet;
a valve main body configured to be transferable between an open position, wherein a volumetric flow connection is established between the fluid inlet and the fluid outlet, and a closed position, wherein the valve main body is arranged in a main sealing seat fixed to the housing, and the volumetric flow connection between the fluid inlet and the fluid outlet is closed off;
a pilot control valve device, comprising a pilot member configured to be transferable by an actuator between an open position, wherein a throttle bore is arranged to be exposed through the valve main body and to connect the fluid inlet and the fluid outlet, and a closed position, wherein the pilot member is arranged to abut a pilot control valve seat disposed within an opening in the valve main body and to close the throttle bore, and
a receptacle for the pilot member and for an energy accumulator, the receptacle provided in addition to the valve main body,
wherein the receptacle is firmly connected to the valve main body, wherein the pilot member is transferable into the open position by the actuator, whereby the pilot member is forced into the receptacle against a restoring force of the energy accumulator in order to release the throttle bore, the receptacle acting as an abutment for the energy accumulator.

13. A method of controlling a hydrogen valve comprising the steps of:
transferring a pilot member from a closed position, in which the pilot member is arranged to abut a pilot control valve seat disposed within an opening of a valve main body, into an open position, whereby the pilot member is forced into a receptacle for the pilot member and for an energy accumulator, the receptacle provided in addition to the valve main body, against a restoring force of the energy accumulator in order to release a throttle bore by energizing an actuator to reduce a pressure difference between a fluid inlet and a fluid outlet, the receptacle acting as an abutment for the energy accumulator, and
transferring the valve main body to an open position to establish a volumetric flow connection between the fluid inlet and the fluid outlet when a certain pressure difference between the fluid inlet and the fluid outlet is reached.

14. The method according to claim 13, wherein the step of transferring the pilot member into an open position takes place against the restoring force of the energy accumulator, and the step of transferring the valve main body into an open position takes place through the release of the energy accumulator.

15. The method according to claim 13, further comprising the steps of:
- energizing the actuator with a minimum current intensity transferring the pilot member immediately and fully into an open end-position; and
- after the step of transferring the pilot member, transferring the valve main body into an open position immediately when a certain pressure difference between fluid inlet and fluid outlet is reached.

\* \* \* \* \*